United States Patent
Aggarwal et al.

(10) Patent No.: US 10,159,096 B2
(45) Date of Patent: Dec. 18, 2018

(54) SYSTEM AND METHOD OF ACHIEVING FAIRNESS IN A MIXTURE OF FULL-DUPLEX AND HALF-DUPLEX NODES IN A WIRELESS NETWORK

(71) Applicant: AT&T Intellectual Property I, L.P., Atlanta, GA (US)

(72) Inventors: Vaneet Aggarwal, Parsippany, NJ (US); Nemmara K. Shankaranarayanan, Bridgewater, NJ (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 186 days.

(21) Appl. No.: 13/796,091

(22) Filed: Mar. 12, 2013

(65) Prior Publication Data
US 2014/0269448 A1    Sep. 18, 2014

(51) Int. Cl.
H04W 74/08    (2009.01)
H04W 84/12    (2009.01)

(52) U.S. Cl.
CPC .......... *H04W 74/085* (2013.01); *H04W 84/12* (2013.01)

(58) Field of Classification Search
CPC .................................................. H04W 74/085
See application file for complete search history.

(56) References Cited

U.S. PATENT DOCUMENTS 5,673,254 A * 9/1997 Crayford ....................... 370/231
7,817,641 B1 10/2010 Khandani
2004/0264423 A1* 12/2004 Ginzburg et al. ............. 370/338
2005/0141420 A1*  6/2005 Li et al. ......................... 370/230
2013/0235720 A1*  9/2013 Wang et al. ................... 370/229
2014/0064301 A1*  3/2014 Rison ............................. 370/448
2014/0169233 A1*  6/2014 Aggarwal et al. ............. 370/277

OTHER PUBLICATIONS

M. Duarte et al., "Design and Characterization of a Full-duplex Multi-antenna System for WiFi networks", Oct. 8, 2012, Department of Electrical and Computer Engineering Rice Univeristy, AT&T Labs-Research.*
M. Duarte, A. Sabharwal, V. Aggarwal, R. Jana, K.K. Ramakrishnan, C.W. Rice, and N.K. Shankaranayanan, "FullFi: Making Full Duplex WiFi Real," Submitted to IEEE Trans. Veh. Tech, 2012, available at arXiv:1210.1639.
M. Duarte, C. Dick, and A. Sabharwal, "Experiment-driven Characterization of Full-Duplex Wireless Systems," Submitted to IEEE Transactions on Wireless Communications, Jul. 2011.
M. Jain, J.I. Choi, T. Kim, D. Bharadia, K. Srinivasan, S. Seth, P Levis, S. Katti, and P. Sinha, "Practical, Real-time, Full Duplex Wireless," in Proc. Mobicom 2011.

(Continued)

Primary Examiner — Jason E Mattis (57) ABSTRACT

In a system having a full-duplex node, a half-duplex node and an access point, modifying a parameter such as a backoff timing such that access probabilities are adjusted for at least one of the access point, the full-duplex node and the half-duplex node. Based on channel access achieved after modifying the backoff timing, communication occurs between one of the full-duplex node and a half-duplex node with the access point. The modified backoff timing can operate independently or in coordination with backoff timers from any other nodes within a system.

18 Claims, 9 Drawing Sheets (56) References Cited

OTHER PUBLICATIONS

J. Choi, M. Jain, K. Srinivasan, P. Levis, and S. Katti. "Achieving single channel, full duplex wireless communication." in Proc. of the ACM Mobicom, Illinois, USA, 2010. ACM New York, NY, USA.
B. Radunovic, D. Gunawardena, P Key, A.P.N. Singh, V. Balan, and G. Dejean, "Rethinking indoor wireless: Low power, low frequency, full duplex," Technical report, Microsoft Technical Report, 2009.
M.A Khojastepour, K. Sundaresan, S. Rangarajan, X. Zhang, and S. Barghi, "The case for antenna cancellation for scalable full duplex wireless communications," in Proc. of Hotnets, Nov. 2011.
E. Aryafar, M.A. Khojastepour, K. Sundaresan, S. Rangarajan, and M. Chiang. "Midu: Enabling mimo full duplex," In Proc. of the ACM Mobicom, 2012.
S. Siwamogsatham, "Achieving Uplink/Downlink Fariness in WLANs via Multiple Backoff Timers," In Proc. of the Advanced Communication Technology, Feb. 2008.

\* cited by examiner

SYSTEM AND METHOD OF ACHIEVING FAIRNESS IN A MIXTURE OF FULL-DUPLEX AND HALF-DUPLEX NODES IN A WIRELESS NETWORK

BACKGROUND OF THE INVENTION

1. Field of the Invention

The present disclosure relates to random access wireless networks and more specifically to a system and method of modifying a parameter (such as a backoff timing or a mode governing contention capabilities of nodes) in one or more nodes within a wireless network that includes a mixture of full-duplex and half-duplex stations in order to modify a probability that a node or an access point will gain access to the channel to communicate data.

2. Introduction

Figure 2:
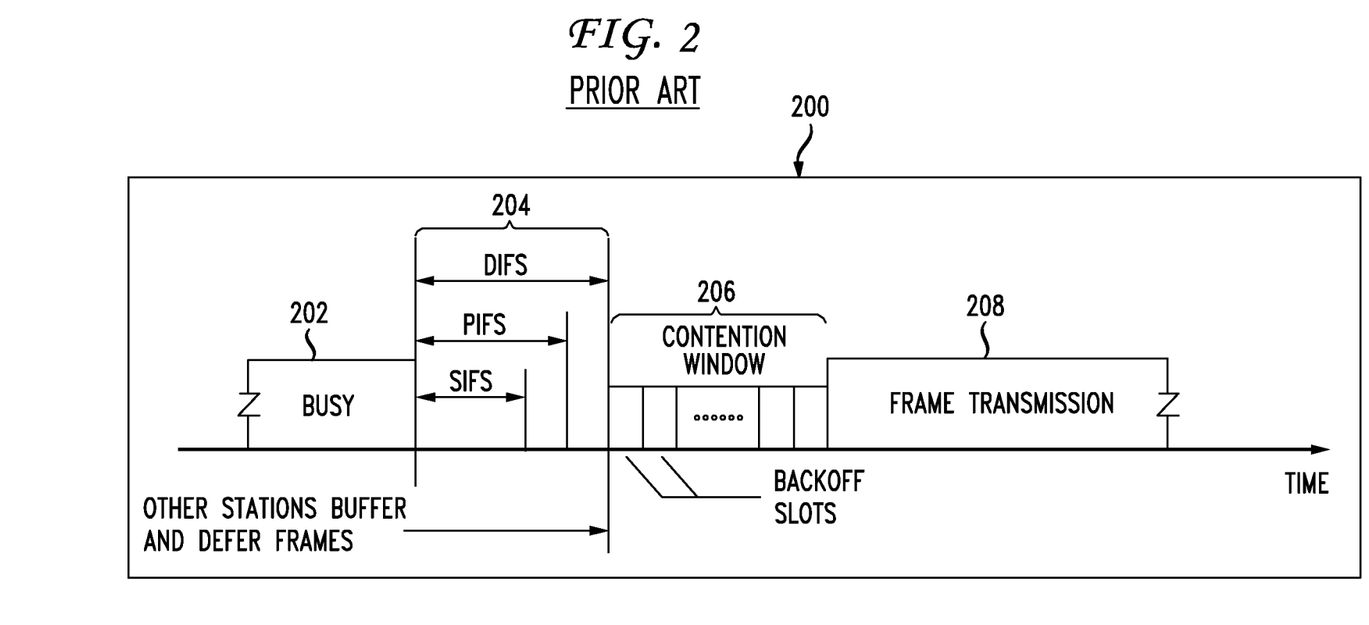
FIG. 2 illustrates a prior art interframe basic relationship.

In wireless networks, such as 802.11 wireless networks, a standard configuration includes a single access point and variety of mobile stations that contend for communication with the access point. In such environments, a number of different coordination functions can manage multi-station access to such an access point. One such function as a distributed coordination function that will cause each station to first check to see that a radio link to the access point is clear before transmitting. To avoid collisions from neighboring stations, each mobile station uses as a random backoff timing after each frame with the first transmitter (i.e., the transmitter having selected the lowest random number) seizing the channel for the radio link. FIG. 2 illustrates the backoff timing via a contention window.

As shown in FIG. 2, the interframe spacing relationships 200 include a busy period 202 in which a station is communicating with the access point, as well as a period of time 204 which can be one of a number of interframe spacings. For example, a "DIFS" is a distributed coordination function interframe space which is defined as a minimal medium idle time for a contention-based service after which stations can have immediate access to the access point if it has been free for a period longer than the DIFS. A "PIFS" is a point coordinator interframe space in which stations with data to transmit in the contention per period can transmit after the PIFS has elapsed and preempt any contention based traffic. An "SIFS" is a short interframe space that is used for the highest priority transmissions such as RTS/CTS frames (requests to send and clear to send).

After such interframe spacing, a contention window 206 is next utilized. The contention window or backoff window follows the interframe spacing and is divided into time slots called "backoff slots." If multiple stations are seeking to communicate, the stations will pick a random slot and then wait for that slot before attempting to access the access point. All slots are equally likely selections. The station that picks the first slot (or the station with the lowest random number) wins the chance to communicate. All numbers are equally likely to be chosen. In some exceptions, voice-over-IP traffic, which is much more sensitive to poor network service than other data applications, may transmit voice frames with a zero backoff rather than selecting a backoff slot number randomly as is required by some wireless standards. Once a station wins a time slot during the backoff window 206, frame transmission 208 proceeds.

The contention window or the backoff time can be increased to include a larger range of possible timeslots when a transmission fails. In some standards, the contention window sizes are always one less than a power of two, such as 31, 63, 127, 155. If a retry counter increases, the contention window expands to the next greatest power of two. In some cases, the physical layer limits the contention window to a particular number such as 1,023 transmission slots. The window size can then be reset to its minimum size after the frames are transmitted successfully.

The above approach does include drawbacks in that all slot numbers are equally likely to be chosen, fairness can nevertheless be difficult to achieve between the stations for a number of reasons.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

This disclosure first presents a general discussion of hardware components which may be used in a system or device embodiment. Following the discussion of the hardware components, various embodiments shall be discussed with reference to embodiments in which the modification of features in the contention window occurs at the access point, a full-duplex node and/or a half-duplex node. Mixed half-duplex/full-duplex systems with random access have a fairness problem. This fairness can be address in any number of ways by changing probability/priority of access to the medium in one or both of the access point and mobile nodes. Backoff timers as one example of how these probabilities can be changed but other approaches are contemplated as well including enabling the access point to switch between different modes where the access point and/or other nodes are allowed to contend or are not allowed to content for access in a particular manner and/or based on a parameter. These various approaches are disclosed herein.

Various embodiments of this disclosure are discussed in detail below. While specific implementations are discussed, it should be understood that this is done for illustration purposes only. A person skilled in the relevant art will recognize that other components and configurations may be used without parting from the spirit and scope of the invention.

Figure 1:
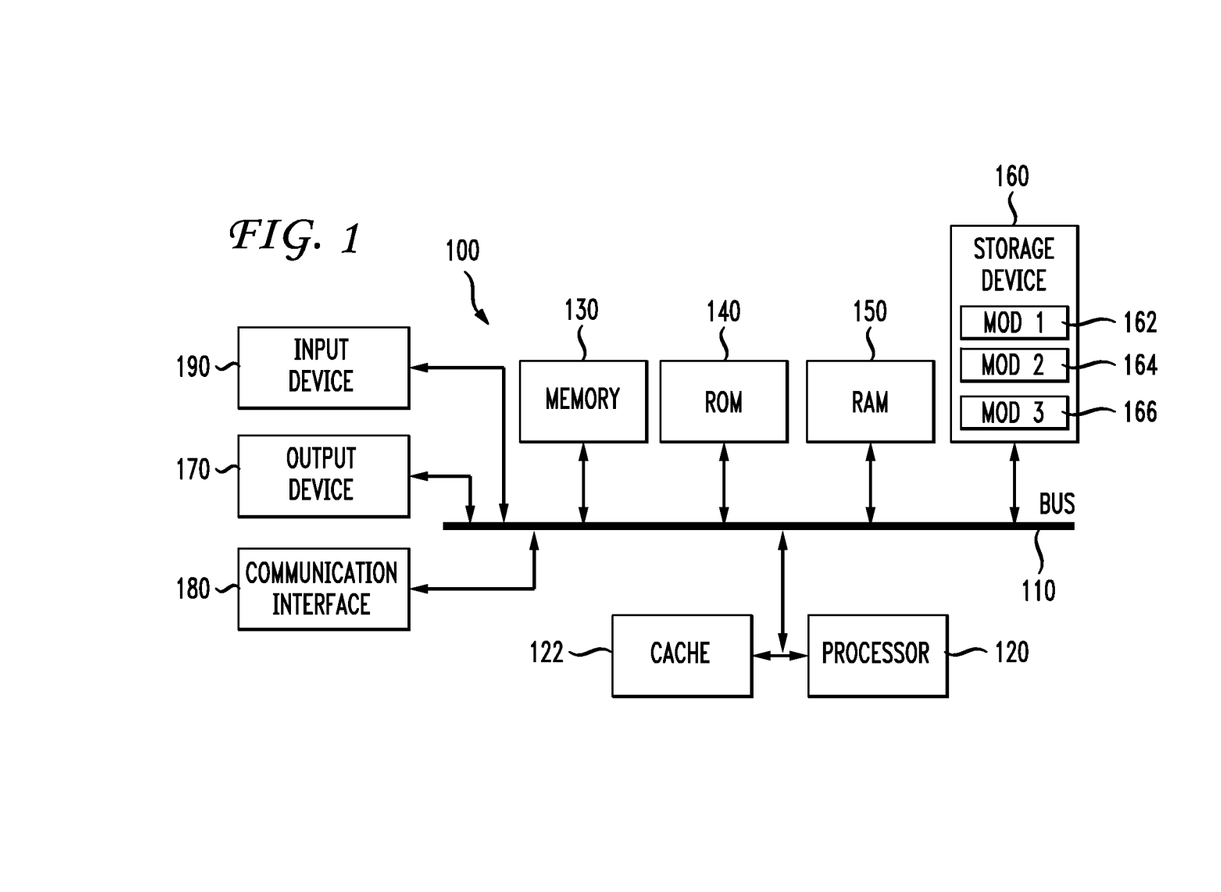
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Figure 3:
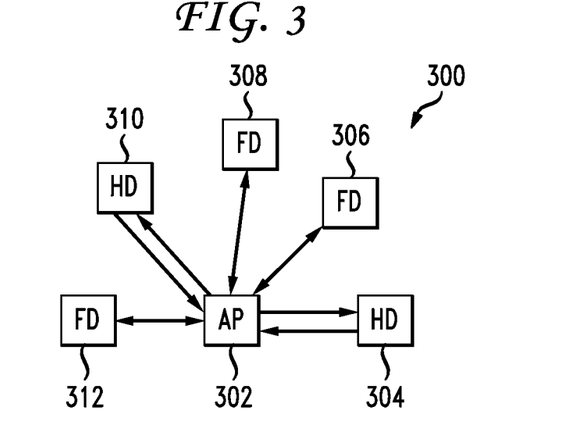
FIG. 3 illustrates a system including an access point and multiple half-duplex nodes and full-duplex nodes.

Having discussed the basic system embodiment, the present disclosure turns to FIG. 3. The context of this disclosure focuses on the performance of a random access time slotted wireless network having a single access point and a mixture of half-duplex and full-duplex stations. Network 300 shows such an environment. The access point 302 is in communication through a contention based mechanism with a number of mobile or wireless stations. A half-duplex station 304 is a station in which packets are only transmitted in one direction at a time. Thus, data is either transmitted from the half-duplex station 304 to the access point 302 or is being transmitted from the access point 302 to the half-duplex station 304. Communication does not occur simultaneously in both directions. Full-duplex node 306 however, involves packets that are transmitted in both directions at the same time. Full-duplex stations 308 and 312 are shown with an additional half-duplex station 310 in FIG. 3. A problem that occurs in a system with a single access point, m full-duplex and n half-duplex stations in the system is that, with respect to throughput, the traditional distributed random access system can cause unfairness with respect to how much throughput is available to each mobile station in the wireless environment. One purpose of the concepts disclosed herein is to enable a generally equal throughput for each node when the respective node communications with an access point. The result of the modifications disclosed herein does not have to mandate exact equal throughput but the modifications can harmonize and make more equal the throughput amongst the various nodes in the system.

Given the probabilities of channel access by the various nodes, an aspect of this disclosure is a generalized analytical formula for the throughputs from one node to another with a discussion of some special cases related to 802.11 distributed channel access based systems. With a more full understanding of channel access probabilities and how they relate to throughput in a mixed environment, the other primary embodiments of this disclosure shall be presented in order to modify backoff timings in the contention window in order to adjust the access probabilities of various nodes. The access point as well as wireless nodes each have to contend for the channel.

Currently deployed wireless communications systems cannot transmit and receive on the same frequency at the same time, i.e., networks do not operate in a single-channel full-duplex fashion. As a result, the networks are either time-division duplex (e.g., WiFi) or frequency-division duplex (e.g., cellular). The key challenge in achieving true full-duplex communication is the large power differential between the "self-interference" created by a node's own radio transmission and the signal of interest. Recently, progress has been made in new full-duplex designs at the physical layer design of full-duplex systems. This disclosure considers a wireless network with one access point and a mix of full-duplex and half-duplex capable stations. In such scenario, this disclosure characterizes the throughput between any pair of nodes.

Noted again is the single access point 302 with m full-duplex stations (306, 308, 312) and n half-duplex stations (304, 310) in the system 300 as shown in FIG. 3. Consider a time-slotted system where each node grabs the channel with certain probability as in a distributed random access system. It is assumed that the collisions only happen in a request to send (RTS) or clear to send (CTS) context due to the random access nature of the system and that the collisions do not impact the throughput significantly since an RTS packet is lost instead of a data packet. Thus, there are no collisions for the purposes of throughput calculations and the different nodes can access the channel with certain probabilities. For the special case of 802.11 distributed channel access (DCA), the backoff timing process would determine these probabilities. A generalized system is considered where there may be priorities. Each of the three categories of node (access point, full-duplex station, half-duplex station) can have different access probabilities based on a parameter, such as the priority access paid for or assigned to each station and/or the access point 302. All communications are presumed to be between the access point and stations, i.e. there is no peer-to-peer communications. During a full-duplex communication, the access point 302 receives from, and simultaneously transmit to, a full-duplex station. A MAC design exists based on this assumption which demonstrates that the full-duplex and half-duplex nodes can coexist in an 802.11-based system. The present disclosure generalizes the 802.11 based system to general channel access probabilities for the three types of nodes.

Other approaches beside a backoff timing change can also be implemented to adjust probabilities of access by either the access point or other nodes. An access point or node could switch or intelligently choose a mode that governs contention for access. The mode can be one of a group of modes covering parameters such where the access point 302 can transmit only or where the access point 302 and all nodes content in the same manner. The access point 302 may not content for an initial transmission but only transmit in response to a full-duplex transmission, or after two half-duplex transmissions, or any combination of full and half duplex transmissions have occurred. The system could choose one of the various modes with a separate probability which then results in adjusting the probability of the access point 302 or other node accessing the channel.

In one aspect, the access point 302 has a single queue for the data packets destined for the stations (304-312), and that the destination of each arriving packet is equally likely to be from any of the stations (304-312). When a full-duplex station 306 grabs (wins the contention process to initiate transmission) the channel to send a packet to the access point 302, the first packet in the access point queue that is destined for the station 306 is removed and a full-duplex transfer occurs between the access point 302 and the full-duplex station 306. This leads to full-duplex packets being removed from the access point queue out of turn. When the access point 302 grabs the channel, it sends data to the station to which the head of the queue data is addressed. Since many out-of-turn packets for full-duplex have been removed, it is not clear what proportion of the time slots grabbed by the access point 302 are used to send data to a half-duplex node vs. a full-duplex node. This disclosure provides analytical formulations for the probability of sending data from the access point 302 to any station when the access point 302 grabs the channel.

Consider two special cases. The first is an 802.11 DCA system, where all the nodes have equal chances of channel access. This system is more suited for uplink than downlink for half-duplex stations since the sum downlink to all half-duplex stations decreases as the number of half-duplex stations increases even though the sum uplink does not decrease. In such a system, when the access point 302 grabs the channel, it never transmits to any full-duplex station and thus these time-slots are used for downlink data to half-duplex stations with probability 1. The downlink throughput to the half-duplex stations is much less than the uplink throughput for the half-duplex stations which is inherent nature of 802.11 DCA system. Thus, a second special case exists where all the uplink and downlink throughput for any station is the same. If there were no full-duplex stations, this corresponds to half the time for uplink and half the time for downlink by giving half the chances to the access point 302. With the increase of full-duplex stations, this gives a gradual increase of the throughput towards doubling as compared to a standard half-duplex system. The fairness among the nodes comes at the expense of the total system throughput for the mixture of full-duplex and half-duplex nodes.

As noted above, FIG. 3 shows the single access point (AP) 302 serving a mixture of full-duplex stations 306, 308, 312 and half-duplex stations 304, 310. The communication system 300 is assumed to be time-slotted with distributed random access. The access point 302 is assumed to have full-duplex capability, i.e., it can transmit and receive simultaneously. The half-duplex stations cannot transmit and receive at the same time. In a time-slot, a half-duplex station can either transmit or receive, but not both. A full-duplex station can transmit and receive simultaneously in a time-slot like the access point 302.

Besides a single access point 302, assume that there are m full-duplex stations 306, 308, 312 and n half-duplex stations 304, 310. The access point 302 has data for all stations and any station has data only for the access point 302. In one scenario, all the buffers are full and thus all the nodes (access points and stations) always have data. With the random-access scheme, there is a contention in each time-slot to decide which node grabs the channel in that time slot to be able to initiate transmission. Let the access point 302 get the channel for $p_A$ fraction of the time slots. Further, assume that a full-duplex station 306 wins the channel access for a $p_F$ fraction of the time slots and a half-duplex station 304 wins the channel access for a $p_H$ fraction of the time slots. Since any time slot is used by some node, the result is $p_A + mp_F + np_H = 1$.

In one aspect, a single queue at the access point 302 which has packets for all the stations. Packets arriving at the access point 302 have a destination which is equally likely to be any of the stations. Moreover, the size of the queue is large enough that it never becomes a bottleneck. When the access point 302 wins the contention, it sends the packet which is at the head of its queue. If this packet at the head of the queue is for a half-duplex station 304, this time-slot is a half-duplex transmission of data from the access point 302 to the respective half-duplex station 304. If the packet at the head of the queue is for a full-duplex station 306, the time-slot is a full-duplex time-slot in which the access point 302 sends and receives data simultaneously from the particular full-duplex station. If the half-duplex station 304 wins the contention in a time slot, there will be a half-duplex communication from the station 304 to the access point 302. If a full-duplex station 306 wins the contention in a time slot, the access point 302 will find the first packet in its queue for the full-duplex station 306 and send this data packet to the full-duplex station 306 while simultaneously receiving a data packet from the full-duplex station 306. Thus, when a full-duplex station 306 wins the contention, the access point 302 may send a packet out of turn as part of the response to an incoming packet from a full-duplex station.

Next, a generalized analytical formulation is disclosed for the system throughputs. Assume that all links operate with the same spectral efficiency and can thus be normalized relative to the achieved throughput in terms of the number of time slots in which a node sends a packet. More precisely, a throughput from node A to node B of t implies that node A sends data to node B for tN time-slots of the N time-slots as N goes to infinity. In other words, the normalized throughput from node A to node B is the fraction of the time-slots in which data is transmitted from node A to node B. Consider as an example a system with one access point 302 and one station. If the station is half-duplex, the sum throughput from the station to the access point 302 and from the access point 302 to the station is 1 (one packet per slot). However, this sum is 2 if the station is full-duplex since there is a packet in each direction during a time slot (two packets per slot). These sum throughputs would also be maintained if the system has multiple stations, as long as they are all full-duplex stations or all half-duplex stations. As full-duplex technology is developed and introduced, full-duplex capable access points will serve a mix of full-duplex stations and legacy half-duplex stations. The sum throughput will be between and 1 and 2. The result below gives the different throughputs between the access point 302 and stations for the general case.

Theorem 1:

In a system with one access point, m full-duplex and n half-duplex stations where the access point 302, a full-duplex station, and a half-duplex station wins the channel access with probability $p_A$, $p_F$, and $p_H$ respectively, the through-puts between various nodes are as follows.

access point to one HD station $$\frac{p_A}{n} p,$$

access point to one FD station $$\frac{p_A}{m}(1-p) + p_F,$$

one of FD station to access point $$\frac{p_A}{m}(1-p) + p_F,$$

one of HD station to access point $p_H$, where $$p = \min\left(1, \frac{n}{n+m} \frac{p_A + mp_F}{p_A}\right)$$

is the fraction of the times that the access point transmits to a half-duplex station after grabbing the channel. The total sum throughput is $1 + mp_F + p_A(1-p)$.

The disclosure next presents a proof of this Theorem. Consider two special cases of a complete full-duplex system and a complete half-duplex system. If all the stations are half-duplex, m=0, $p_F$=0 and thus p=1. Thus, the total throughput is 1. If all the stations are full-duplex, n=0, $p_H$=0 and thus p=0. Using the fact that $np_H + mp_F + p_A = mp_F + p_A = 1$, one can sum all the throughputs and derive the sum through-put to be $1 + mp_F + p_A = 2$. Having verified the two basic cases, the disclosure next proves the theorem for a system with a mixture of full-duplex and half-duplex stations.

Consider the case when $p_F > p_A/n$. The data packets for a full-duplex station get removed from the queue much faster than $p_A/n$ which means that even if the data packets for a half-duplex station are depleted at rate of $p_A/n$, there are no full-duplex data packets at the head of the queue with probability 1. This is because from the same queue, full-duplex packets get depleted at higher rate than half-duplex thus not leaving full-duplex packets at close to the head with probability 1. This means that when the access point 302 gets a chance, it only sends data to half-duplex stations. Let p be the probability that the access point 302 sends data to any half-duplex station when it grabs the channel, then p=1.

If $p_F \leq p_A/n$, let p be the probability that the access point 302 sends data to any half-duplex station when it grabs the channel. Then, the throughput from the access point 302 to a half duplex station is $pp_A/n$ while the throughput from the access point 302 to a full-duplex station is $p_F+(1-p)p_A/m$. If $pp_A/n > p_F+(1-p)p_A/m$, half-duplex packets will be depleted faster from the access point queue thus giving full-duplex data packets at the head of the queue. This will decrease p. However, if $pp_A/n < p_F+(1-p)p_A/m$, there will be more half-duplex packets left at the head increasing p. Thus, the system stabilizes such that $pp_A/n = p_F+(1-p)p_A/m$. This gives $$p = \frac{n}{n+m} \frac{p_A + mp_F}{p_A}.$$

Combining the two cases and assuming m, n>0, results in $$p = \min\left(1, \frac{n}{n+m} \frac{p_A + mp_F}{p_A}\right).$$

The throughput from half-duplex station to the access point 302 is $p_H$. This is because a half-duplex station sends to the access point 302 only when the half-duplex station wins the channel access. The access point 302 sends to a half-duplex station when the access point 302 wins the channel and sends to a half-duplex station with probability p/n. Thus, the throughput from the access point 302 to a half-duplex station is $$\frac{p_A}{n} p.$$

The throughput from the access point 302 to a full-duplex station is the same as the throughput from a full-duplex station to the access point 302. The access point 302 sends data to a full-duplex station in two scenarios. The first is when a full-duplex station grabs the channel, which happens in $p_F$ fraction of the time-slots. The second is when the access point 302 grabs the channel and has data for this full-duplex station at the head of the queue which happens in $$\frac{p_A}{m}(1-p)$$

fraction of the time-slots. Thus, the throughput from the access point 302 to an full-duplex station is $$\frac{p_A}{m}(1-p) + p_F.$$

which proves the statement of the Theorem.

Two special cases illustrate the main result. The first case is an 802.11 based system where all nodes get equal channel access while the second case is where the access point 302 grabs the channel from half of the time-slots.

In an 802.11-DCA system where each node has equal chance of winning a time-slot, $p_A = p_F = p_H$. Assume both n and m are greater than 0. In this case p=1, which means that when the access point 302 gets the channel, it sends data to only half-duplex stations. Thus, the throughput to a HD station is $p_A/n$, throughput from a HD station to the access point is $p_H$, and the throughput to a FD station is $p_F$ with $$p_A = p_F = p_H = \frac{1}{1+m+n}.$$

The MAC design in this case for instance achieves $p_A = p_F = p_H$, and the access point 302 has no data for a FD station when the access point 302 grabs the channel. The sum throughput of the system in this case is $$1 + \frac{m}{1+m+n}.$$

Figure 4:
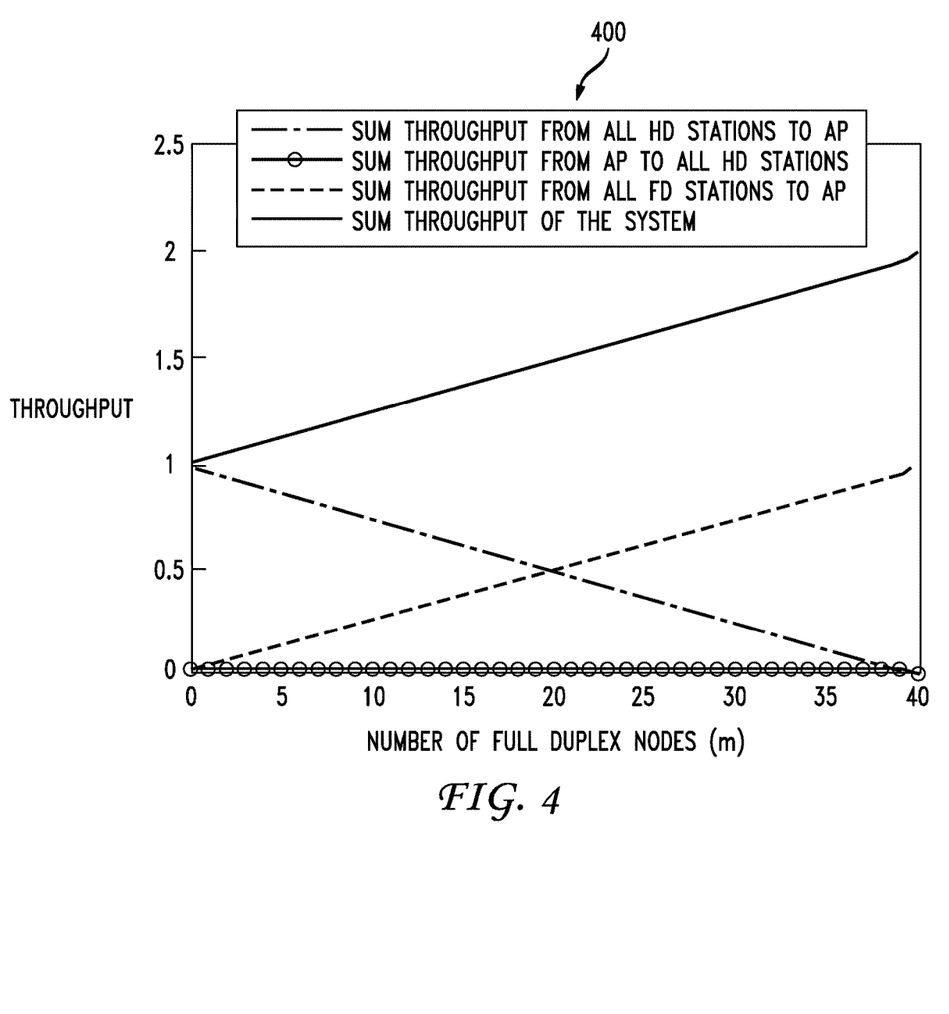
FIG. 4 illustrates the throughput between nodes for a first special case for a system with 40 stations.

Thus, the sum throughout increases by a factor of $$1 + \frac{m}{1+m+n}$$

as compared to a legacy half-duplex system. As an example, consider 40 stations, where m of them are full-duplex stations. FIG. 4 depicts the total uplink and downlink throughputs to both full-duplex and half-duplex stations and the total system throughput 400 with increasing full-duplex stations. The total system throughput increases with increase of full-duplex stations. The uplink and downlink throughputs for half-duplex stations are very asymmetric which is a characteristic of 802.11 based system.

FIG. 4 shows that the 802.11 system gives fewer time-slots for downlink than for uplink in a legacy half-duplex case. Consider a system where the downlink and uplink throughput of half-duplex station is symmetric. This results in a system with $$p_H = p_F = \frac{p_A}{n} = \frac{1}{2n+m} \text{ for } n > 0$$

and $$p_F = \frac{1}{m},$$

$$p_H = p_A = 0 \text{ for } n = 0.$$

With these settings, the uplink/downlink throughput to any of the full-duplex or half-duplex station is the same and equals $$\frac{1}{2n+m}.$$

Figure 5:
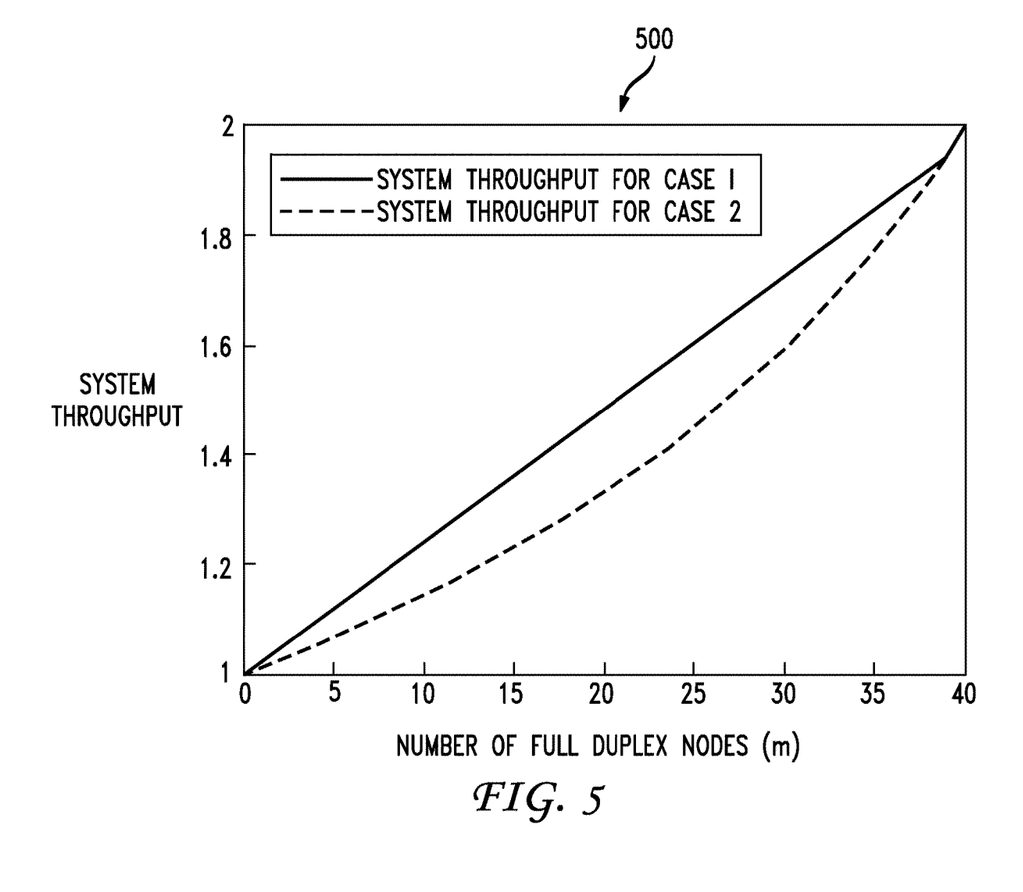
FIG. 5 illustrates the system throughput for the two special cases with 40 stations.

The system is thus fully-symmetrical in the throughput between the access point 302 and any station 304-312. At the extreme scenarios of no full-duplex node, the access point 302 gets the channel with probability ½ and makes the uplink and downlink throughput symmetric. FIG. 5 illustrates 500 that the symmetric rates come at the cost of total system throughput. The total system throughput reduces because the access point 302 grabs the channel more often thus favoring more half-duplex downlink throughput which further results in hurting the total system throughput.

Having discussed above the generalized analytical formula for system throughputs, a solution to unfairness with respect to a distributed channel access system is next discussed.

Figure 6:
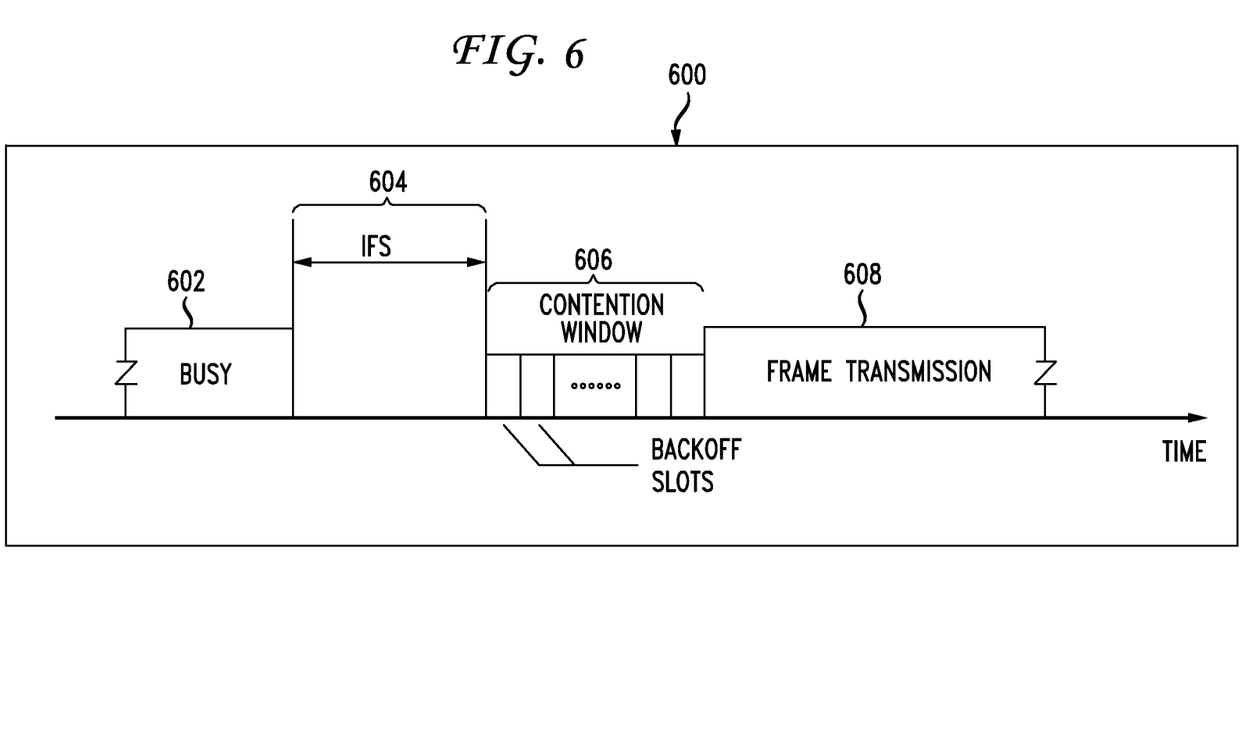
FIG. 6 illustrates a general interframe spacing and contention window according to an aspect of the disclosure.

FIG. 6 illustrates the general timing of a system which is similar to FIG. 2. The timing structure 600 includes a busy portion 602 in which one node is communicating with an access point in either full-duplex or half-duplex mode, an interframe spacing portion 604 which is a period of time following the conclusion of time frame 602, and after which is the contention window 606 with the backoff slots. The basic concepts which shall be discussed next involve employing one or more independent timers at each node (i.e., one or more of the access points, half-duplex stations and/or full-duplex stations) to modify the access probabilities of the node. The result of modifying these back up timers will be to change the previous operation of the backoff system in which all slot numbers in the contention window are equally likely for stations. In such a case, the selection of the backoff slots by individual stations can be modified such that it is no longer random or quasi-random to get particular stations a higher probability of selecting an earlier backoff slot which allows such a station to "win" the contention window for the ability to communicate with the access point. The frame transmission 608 then continues on once a station wins access.

One result of this approach is the ability to enable all the uplink and downlink throughputs of all of the users to be the same or for the access to the channel to be tuned in a particular way. Such tuning will be necessary in order to enable throughput fairness in a mixed system of full- and half-duplex nodes. The adjustment can be made in the timing in window 206 and/or in the interframe spacing time 604.

Figure 7:
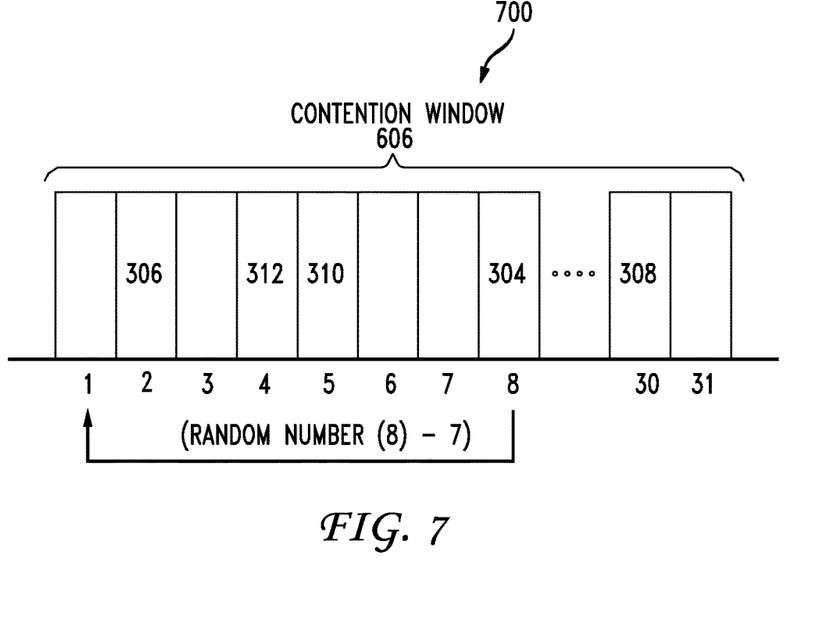
FIG. 7 illustrates an example method of modifying a backoff timing in a contention-based access network.

FIG. 7 illustrates an example 700 of backoff timing changes in the timing window, which is generally similar to contention window 606. Just the contention window 606 is shown including time slots 1-8, 30 and 31. Assume that the various stations in FIG. 3 have each generated a random number from 1-31 for the purpose of determining who is going to win the contention round for access to the access point 302. As is shown in FIG. 7, station 306 generated a random number of 2, station 312 generated a random number of 4, station 310 generated a random number of 5, station 304 generated a random number of 8 and station 308 generated a random number of 30. Under this scenario, station 306 would be the station with the lowest or earliest time slot during the contention window and thus would "win" the contention and have access to the access point.

Assume however that given the throughput issues raised above, for throughput fairness it would be desirable for station 304, which is a half-duplex station, to win the contention round rather than the full-duplex station 306. One example of modifying or employing backoff timing changes would be to include an adjustment just for station 304 in which its random number that is generated is subtracted by 7 such that a resulting number is used for its time slot in the contention round. In such a case, 8−7 would result in time slot 1 which would enable station 304 to win the contention round. Modifying the system to accommodate or adjust probabilities can be initiated in a number of different ways.

For example, such a change may be instructed by the access point 302 to station 304. Data could be communicated from the access point 302 to the half-duplex station 304 with a particular number to use or to subtract from the number that is randomly generated. A number could also be assigned such as simply a low number in the contention window. The access point 302 can have data regarding the half-duplex and full-duplex nature of all of the stations which are contending for communication and thus may be able to tailor a particular adjustment at one or more stations within the environment 300 in order to maintain throughput fairness.

Also in some cases, the access point 302 itself, because it has data that it desires to transmit in its queue to one or more stations, it could employ its own backoff changes. Therefore, any node within the environment 300 can initiate timing backoff changes according to this disclosure. The use of backoff timers is given as an example to adjust probability of access. This disclosure also covers other methods and systems that can adjust probability of access (by either an access point or a mobile device) which may or may not use backoff timers for their implementation. For example, the access point 302 can have a capability to switch between the following modes (a) where only the access point 302 can transmit and (b) where the access point 302 and all other nodes contend in the same manner, and (c) the access point 302 does not contend for initial transmission but only transmits in response to a full-duplex transmission. Choosing mode (a), with a probability "p," thus adjusts the probability of the access point 302 accessing the channel.

The selection of how the timing adjustments may be done can of course be based on a throughput analysis using, for example, the equation set forth herein which address the throughputs and probabilities of the various nodes within the network. The size of the backoff slots could also be modified to give particular stations more or less time in their communication time slot to enable throughput fairness. Further, the interframe spacing could be adjusted for a node that should gain priority to enable throughput fairness.

Figure 8:
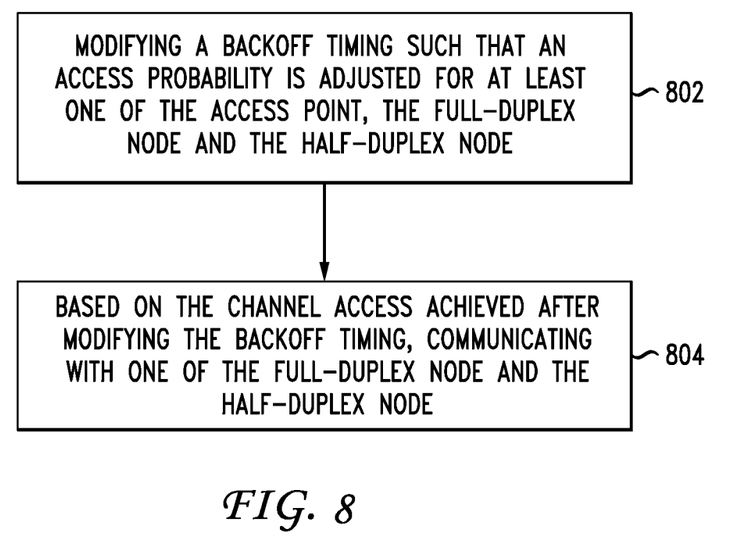
FIG. 8 illustrates a method embodiment of the present disclosure.

The above discussion leads to an example method embodiment of the disclosure which is shown in FIG. 8. In this figure, the steps are being performed by the access point 302. The method includes, at the access point in a system having a full-duplex node 306 and a half-duplex node 304, modifying a parameter such as a backoff timing (or a mode governing now transmission is handled between the nodes and access channel) such that access probabilities are adjusted for at least one of the access point 302, the full-duplex node 306 and the half-duplex node 304 (802) and, based on the channel access achieved after modifying the parameter, communicating with one of the full-duplex node 306 and the half-duplex node 304 (804). Other aspects of this embodiment include the method shown in FIG. 8 wherein a backoff timer at the access point 302 operates independently of a full-duplex node backoff timer and a half-duplex node backoff timer. In other words, the modifications to the parameter or the backoff timer at the access point can be modified and adjusted based on data such as the throughput or other data which would be independent of the backoff timers or other parameters at the other nodes. The full-duplex nodes and the half-duplex nodes could continue to maintain their approach of selecting a random number for the time slot during the contention window which governs whether or not the respective node gets access to the access point 302.

In another aspect, after modifying the parameter or the backoff timing, an uplink throughput and a downlink throughput associated with the access point 302 are the same. In other words, applying the above approach of modifying of the parameter or backoff timing can result in harmonizing the various throughputs or resulting in a particular throughput that is desired for QoS or other reasons.

The method could also further include receiving, at the access point 302, an analysis of the throughput associated with at least one full-duplex node and/or at least one half-duplex node. The analysis could include throughput and/or could include other data such as how close each respective node is the access point 302, how many dropped packets exist, a priority of a particular user or device, a QoS, and so forth. In other words, the modification of the parameter or the backoff timing can be based on data other than throughput, such as priority data. For example, node 304 within the environment 300 could have paid extra money for a higher priority in the contention round and thus, within its backoff timer or as instructed by the access point 302, initiate a modification such that it has a higher probability of success in the contention round. The parameter or the backoff timing could be therefore based on any type of analysis of the environment having the full-duplex node and the half-duplex node.

Modifying the backoff timing could include one of increasing an amount of time in the backoff timing and decreasing the amount of time in the backoff timing. Increasing the amount of time could involve causing the timeslot that is selected to be later in the contention window or earlier in the contention window. For example, the modification does not necessarily have to be beneficial for the particular node. An access point 302 may modify its backoff timing by adding a certain number to whatever random number is generated such that its timing slot is near the end of the contention window such as in slots 25-31. This of course would increase the probability that other nodes within the system would win the contention round and be able to have access and communicate their data.

Figure 9:
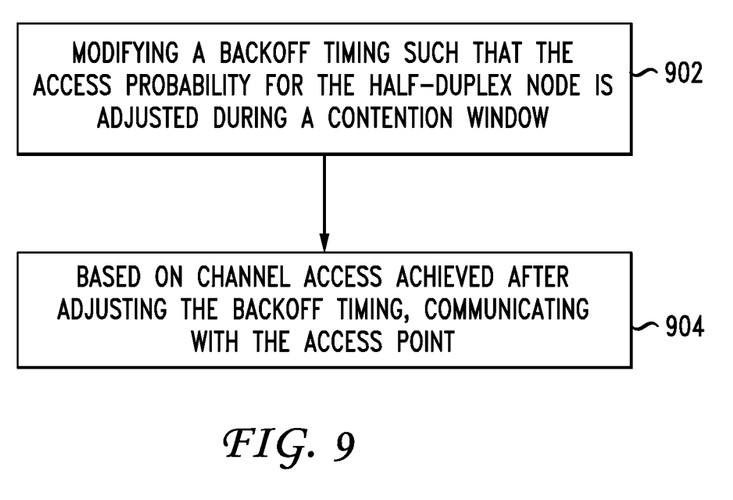
FIG. 9 illustrates another method embodiment.

Next, FIG. 9 illustrates an example method that is performed on one of the nodes such as the half-duplex node 304. The method includes, at a half-duplex node in a system having an access point and a full-duplex node, modifying a parameter (such as the backoff timing or a mode chosen from a group of modes governing contention procedures) such that the access probability for the half-duplex node is adjusted during a contention window (902) and, based on channel access achieved after adjusting the parameter, communicating with the access point (904). The parameter could be a backoff timing or any modified parameter such as a mode governing which node can or cannot contend to access the channel to adjust probabilities up or down for one or more nodes.

The modification of the backoff timing at a half-duplex node can be independent of backoff timings of an access point or other nodes within the system or could be dependent upon and coordinated with other access timings. For example, if it is highly desirable for half-duplex node 304 to increase its probability of successfully weighing a contention round in the contention window, the modification of the backoff timing for node 304 could cause it to achieve a lower number timeslot in the contention window 606 while at the same time, the access point 302 could adjust or modify its backoff timing such that its probability is higher of it achieving a later timeslot in the contention window such as in slots 30 or 31. Thus, the modification of the backoff timing at any particular node can be independent of other nodes or can be coordinated with other nodes.

From the standpoint of the half-duplex node 304, the modification of the backoff timing could be based on data that it receives such as performance data or it could be adjusted based on instructions received from the access point 302 with respect to whether it should initiate a modification of its backoff timing. The instruction could also come from another node in a peer-to-peer context or from an outside source or service.

In another aspect, manual or peer-to-peer communication could occur between the half-duplex node 304 and one or more of the other nodes communicating or striving to communicate with the access point 302. Such peer-to-peer information could enable the half-duplex node 304 (or any other node) to gain a better understanding of other nodes within the environment and their capabilities, which could thus cause the half-duplex node 304 to adjust its backoff timing or adjust another parameter in the system to increase or decrease its probability of winning the channel. For example, assume the half-duplex node 304 is the only half-duplex node in the system and 10 other full-duplex nodes exist. An algorithm could establish that when each of the other nodes within the system is communicating with the access point 302, each full-duplex node would communicate in a full-duplex mode with data being transmitted to and from the respective full-duplex node simultaneously. Such an arrangement would give each of the other nodes double the throughput of the half-duplex node. Therefore, based on that basic knowledge, the half-duplex node could be authorized or choose to modify its backoff timing (or some other aspect or parameter of the system, such as the inter-frame spacing time period) to increase (or decrease) its probability of gaining access to the system and thus leveling out or rendering more fair the throughput usage for the half-duplex node 304.

Figure 10:
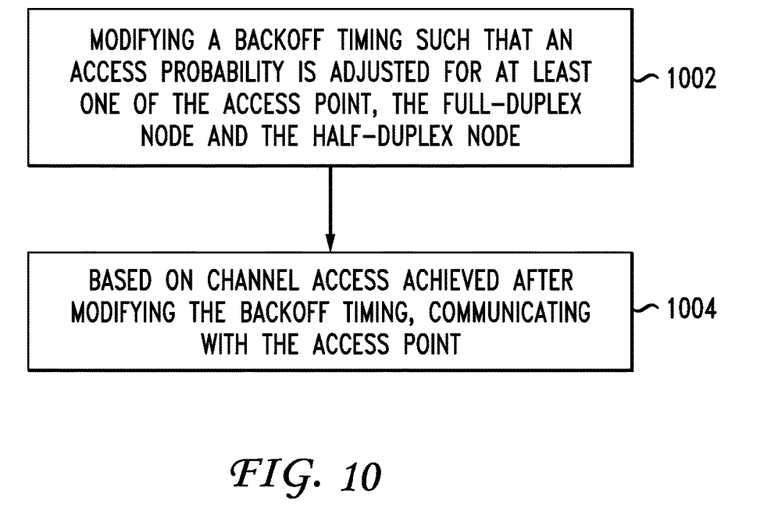
FIG. 10 illustrates yet another method embodiment.

FIG. 10 illustrates an example modification of timing in a full-duplex mode. This method includes, at a full-duplex node in a system having an access point and a half-duplex node, modifying a backoff timing such that access probabilities are adjusted for at least one of the access point, the full-duplex node and the half-duplex node (1002). Based on channel access achieved after modifying the backoff timing, the full-duplex node communicates with the access point (1004). Similar to the half-duplex node embodiment of FIG. 9, when the modification of the backoff timing occurs at a full-duplex node, it can also be independent of any other backoff timings of any other node in the network or could be interdependent upon or coordinated with backoff timings of the access point or other nodes within the network. Further, as noted above, the modification made that adjusts the access probabilities can relate to the inter-frame spacing timing, the size of the timing slot, etc.

A random-access time-slotted wireless network with a single access point and a mix of half-duplex and full-duplex stations is presumed. All traffic is between the access point and stations, and the access point has a single queue (or could have multiple queues) and picks the packet at the head of the queue when it initiates a transmission, but can search the queue for a suitable packet when responding to an incoming full-duplex transmission. A generalized analytical formulation is developed for the throughputs from one node to other. Full-duplex transmissions involved packets transmitted in both directions, and this influences the dynamics of the queue at access point. A steady state probability of the access point initiating transmission to a half-duplex stations exists. For example, in an equal access system for all nodes as in 802.11 DCA, the access point never initiates transmission to a full-duplex station when it wins the channel contention. Thus, a generally equal probability of access can be achieved.

Embodiments within the scope of the present invention may also include computer-readable media and/or a computer-readable device, for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

We claim:

1. A method comprising:

in an access point communicating with a full-duplex node and a half-duplex node, modifying a random number generated by the half-duplex node for use in a time slot of a contention window for accessing the access point such that an access probability function for the half-duplex node is adjusted to favor access to the access point by the half-duplex node over the full-duplex node, wherein the modifying of the random number further comprises reducing the random number to a new number that is lower than a full-duplex random number generated by the full-duplex node; and based on channel access achieved after modifying the random number, communicating with one of the full-duplex node and the half-duplex node.

2. The method of claim 1, wherein modifying the random number adjusts a backoff timer at the access point that operates independently of a full-duplex node backoff timer and a half-duplex node backoff timer.

3. The method of claim 1, wherein after modifying the random number, an uplink throughput and a downlink throughput associated with the access point are equal.

4. The method of claim 1, further comprising:

receiving at the access point an analysis of throughput associated with the full-duplex node and the half-duplex node.

5. The method of claim 1, further comprising:

modifying a node backoff timing in one of the full-duplex node and the half-duplex node.

6. The method of claim 1, wherein modifying the random number results in modifying a backoff timing by one of increasing an amount of time in the backoff timing and decreasing the amount of time in the backoff timing.

7. The method of claim 1, wherein the random number is a contention round bidding parameter that comprises a mode of governing access, wherein the mode is one of a first mode where the access point and all nodes contend in a same manner for access and a second mode where the access point does not contend for initial transmission but only transmits in response to a full-duplex transmission.

8. A system comprising:

a processor; and a computer-readable medium having instructions which, when executed by the processor, cause the processor to perform operations comprising:

in an access point communicating with a full-duplex node and a half-duplex node, modifying a random number generated by the half-duplex node for use in a time slot of a contention window for accessing the access point such that an access probability function for the half-duplex node is adjusted to favor access to the access point by the half-duplex node over the full-duplex node, wherein the modifying of the random number further comprises reducing the random number to a new number that is lower than a full-duplex random number generated by the full-duplex node; and based on channel access achieved after modifying the random number, communicating with one of the full-duplex node and the half-duplex node.

9. The system of claim 8, wherein modifying the random number adjusts a backoff timer at the access point that operates independently of a full-duplex node backoff timer and a half-duplex node backoff timer.

10. The system of claim 8, wherein after modifying the random number, an uplink throughput and a downlink throughput associated with the access point are the same.

11. The system of claim 8, the computer-readable medium having further instructions stored which, when executed by the processor, result in operations comprising:

receiving at the access point an analysis of throughput associated with the full-duplex node and the half-duplex node.

12. The system of claim 8, the computer-readable medium having further instructions stored which, when executed by the processor, result in operations comprising:

modifying a node backoff timing in one of the full-duplex node and the half-duplex node.

13. The system of claim 8, wherein modifying the random number results in one of increasing an amount of time in a backoff timing and decreasing the amount of time in the backoff timing.

14. A computer-readable storage device having instructions stored which, when executed by an access point, cause the access point to perform operations comprising:

in an access point communicating with a full-duplex node and a half-duplex node, modifying a random number generated by the half-duplex node for use in a time slot of a contention window for accessing the access point such that an access probability function for the half-duplex node is adjusted to favor access to the access point by the half-duplex node over the full-duplex node, wherein the modifying of the random number further comprises reducing the random number to a new number that is lower than a full-duplex random number generated by the full-duplex node; and based on channel access achieved after modifying the random number, communicating with one of the full-duplex node and the half-duplex node.

15. The computer-readable storage device of claim 14, wherein modifying the random number adjusts a backoff timer at the access point that operates independently of a full-duplex node backoff timer and a half-duplex node backoff timer.

16. The computer-readable storage device of claim 14, wherein after modifying the random number, an uplink throughput and a downlink throughput associated with the access point are equal.

17. The computer-readable storage device of claim 14, having further instructions stored which, when executed by the computing device, caused the computing device to perform further operations comprising:

receiving at the access point an analysis of throughput associated with the full-duplex node and the half-duplex node.

18. The computer-readable storage device of claim 14, wherein modifying the random number results in modifying a backoff timing by one of increasing an amount of time in the backoff timing and decreasing the amount of time in the backoff timing.

* * * * *